United States Patent
Åström et al.

(10) Patent No.: US 10,813,014 B2
(45) Date of Patent: Oct. 20, 2020

(54) RECEIVING A PERIODIC, WIDEBAND SYNCHRONIZATION SIGNAL IN A NARROWBAND RECEIVER

(71) Applicant: Telefonaktiebolaget LM Ericsson (publ), Stockholm (SE)

(72) Inventors: Magnus Åström, Lund (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 228 days.

(21) Appl. No.: 15/781,612

(22) PCT Filed: Mar. 5, 2018

(86) PCT No.: PCT/EP2018/055287
§ 371 (c)(1),
(2) Date: Jun. 5, 2018

(87) PCT Pub. No.: WO2018/172044
PCT Pub. Date: Sep. 27, 2018

(65) Prior Publication Data
US 2019/0141587 A1    May 9, 2019

Related U.S. Application Data

(60) Provisional application No. 62/476,596, filed on Mar. 24, 2017.

(51) Int. Cl.
*H04W 36/00* (2009.01)
*H04L 27/26* (2006.01)
(Continued)

(52) U.S. Cl.
CPC ..... *H04W 36/0072* (2013.01); *H04L 27/2655* (2013.01); *H04L 27/2656* (2013.01);
(Continued)

(58) Field of Classification Search
CPC ........... H04W 36/0072; H04W 72/048; H04W 56/001; H04W 36/0066; H04L 27/2662;
(Continued)

(56) References Cited

U.S. PATENT DOCUMENTS 5,272,724 A * 12/1993 Solomon .................. H04L 5/06
370/482
5,668,837 A 9/1997 Dent
(Continued)

FOREIGN PATENT DOCUMENTS

CN 101422007 A 4/2009
CN 1039744008 A 8/2014
(Continued)

OTHER PUBLICATIONS

NR SS Design for Wideband and Narrowband UEs Sierra Wireless RAN1 # 86 meeting, R1-1609818 Oct. 2016 (Year: 2016).*
(Continued)

*Primary Examiner* — Rina C Pancholi
(74) *Attorney, Agent, or Firm* — Coats & Bennett, PLLC

(57) ABSTRACT

A radio network device, having a narrowband receiver and operative in a wireless communication network, exploits the periodicity of transmission of network sync signals by iteratively receiving a plurality of frequency-offset portions of the sync signal, and then assembling the portions to recreate the entire sync signal. The recreated sync signal is then processed to attempt network detection and synchronization. In some embodiments, frequency/time compensation may be applied to the received and stored sync signal portions, prior to their combination, to compensate for uncertainty in the frequency drift (and time drift due to frequency error) of the sync signal location.

20 Claims, 6 Drawing Sheets

(51) Int. Cl.
*H04W 56/00* (2009.01)
*H04W 72/04* (2009.01)

(52) U.S. Cl.
CPC ...... *H04L 27/2657* (2013.01); *H04L 27/2662* (2013.01); *H04W 36/0066* (2013.01); *H04W 56/001* (2013.01); *H04W 72/048* (2013.01)

(58) Field of Classification Search
CPC ............. H04L 27/2655; H04L 27/2656; H04L 27/2657
See application file for complete search history.

(56) References Cited

U.S. PATENT DOCUMENTS

| | | | |
|---|---|---|---|
| 5,802,461 | A | 9/1998 | Gatherer |
| 5,917,850 | A | 6/1999 | Fujita et al. |
| 7,426,234 | B2 | 9/2008 | Simmons et al. |
| 7,434,150 | B1 | 10/2008 | Barash |
| 10,079,705 | B1 | 9/2018 | Sharpe et al. |
| 2005/0249181 | A1* | 11/2005 | Vijayan ............... H04L 27/2662 370/344 |
| 2007/0242765 | A1 | 10/2007 | Parizhisky et al. |
| 2008/0069060 | A1* | 3/2008 | Das ........................ H04L 5/023 370/337 |
| 2010/0041338 | A1* | 2/2010 | Hannagan ........... H04L 27/2657 455/62 |
| 2012/0163508 | A1* | 6/2012 | Kuffner .................. H04L 27/04 375/340 |
| 2012/0307743 | A1 | 12/2012 | McGowan et al. |
| 2013/0039299 | A1* | 2/2013 | Papasakellariou .... H04L 1/0073 370/329 |
| 2015/0071258 | A1 | 3/2015 | Sanguinetti et al. |
| 2016/0087744 | A1* | 3/2016 | El Ayach ............. H04J 11/0086 370/328 |
| 2016/0337105 | A1 | 11/2016 | Lawton et al. |
| 2016/0345319 | A1 | 11/2016 | Zhou et al. |
| 2017/0094621 | A1 | 3/2017 | Xu et al. |
| 2017/0135052 | A1 | 5/2017 | Lei et al. |
| 2017/0311276 | A1 | 10/2017 | Tsai et al. |
| 2017/0346669 | A1 | 11/2017 | Yu et al. |
| 2018/0270771 | A1* | 9/2018 | Chendamarai Kannan ................. H04J 11/0073 |

FOREIGN PATENT DOCUMENTS

| | | |
|---|---|---|
| RU | 2278470 C2 | 6/2006 |
| WO | 2017184837 A1 | 10/2017 |
| WO | 2018073683 A1 | 4/2018 |
| WO | 2018169963 A1 | 9/2018 |

OTHER PUBLICATIONS

MCC Support, 3GPP TSG RAN WG1 Meeting #88bis, R1-1704172, Final Report of 3GPP TSG RAN WG 1 #88 v. 1.0.0 (Athens, Greence, Feb. 13-17, 2017), Spokane, USA, Apr. 3-7, 2017, pp. 1-152.

Ericsson, 3GPP TSG-RAN WG1 #89s, R1-1706890, Narrowband measurement accuracy improvement for NB-IoT, 6.2.7.2, Hangzhou, China, May 15-19, 2017, pp. 1-9.

Sierra Wireless, 3GPP TSG RAN WG1 Meeting #86bis, R1-1609818, NR SS Design for Wideband and Narrowband UEs, 8.1.5.1 Synchronization signal and DL broadcast signal/channel, Lisbon, Portugal, Oct. 10-14, 2016.

Ericsson, Qualcomm, 3GPP TSG RAN Meeting #75, RP-170732, New WID on Even further enhanced MTC for LTE, 101.1, Dubrovnik, Croatia, Mar. 6-9, 2017.

Ericsson, 3GPP TSG-RAN WG2 Meeting #90bis, R1-1716995, Reduced system acquisition time for MTC, 6.2.5.1, Prague, Czech Republic, Oct. 9-13, 2017.

Ericsson, 3GPP TSG-RAN WG1 Meeting #87, R1-1611899, NR Synchronization signal frequency raster, 7.1.2.1, Reno, Nevada, USA, Nov. 14-18, 2015.

Ericsson, 3GPP TSG-RAN WG1 Meeting #88, R1-1702122, NR Synchronization Complexity and Periodicity, 8.1.1.1.4, Athens, Greece, Feb. 13-17, 2017.

Ericsson, 3GPP TSG-RAN WG1 Meeting #88bis, R1-1706020, UE Cell Search Energy Consumption and Latency, 8.1.1.6, Spokane, Oregon, USA, Apr. 3-7, 2017.

Ericsson, 3GPP TSG-RAN1 WG1 Meeting #88, R1-1702121, NR System Sync Frequency Raster, 8.1.1.1.3, Athens, Greece, Feb. 13, 2017.

Lin, Jiapei, et al., "The Primary Synchronization Signal of 5G NR, 14th International Conference on Wireless Communications", Networking and Mobile Computing (WiCOM 2018), Sep. 18-20, 2018; Chongqing, China, ISBN: 978-1-60595-578-0, pp. 454-463.

ITRI, "Discussion on SSB transmission for NR-U", 3GPP TSG RAN WG1 Meeting #94, Gothenburg, Sweden, Aug. 20-24, 2018, R1-1809184.

Potevio, "Discussion on SSB design for NR-U", 3GPP TSG RAN WG1 Meeting #93, Busan, Korea, May 21-25, 2018, R1-1807229.

Huawei, HiSilicon, "Initial access signal and channels in NR unlicensed band", 3GPP TSG RAN WG1 Meeting #97, Reno, USA, May 13-17, 2019, R1-1906041.

* cited by examiner

RECEIVING A PERIODIC, WIDEBAND SYNCHRONIZATION SIGNAL IN A NARROWBAND RECEIVER

FIELD OF INVENTION

The present invention relates generally to wireless communications and in particular to a system and method of receiving a periodic, wideband network synchronization signal by a radio network device having a narrowband receiver.

BACKGROUND

Wireless communication networks are ubiquitous in many parts of the world. Advances in state of the art in communication technology, increased power and sophistication of radio network devices such as User Equipment (UE), e.g., smartphones, and concomitant increases in the complexity and data exchange requirements of user applications, all require ever-increasing bandwidth and data rates in wireless networks implementations. The Third Generation Partnership Project (3GPP) develops and promulgates technical standards that define the protocols and requirements of wireless networks, ensuring interoperability geographically and between equipment makers. 3GPP has defined, and operators worldwide have deployed, a $4^{th}$ generation (4G) standard known as Long Term Evolution (LTE), defined in 3GPP Technical Specification Releases 8-13. LTE includes numerous provisions to address high-bandwidth requirements, such as wider carriers (up to 20 MHz), carrier aggregation (allowing up to 100 MHz of aggregated bandwidth), multiple-antenna techniques (such as beamforming, MIMO), interference coordination (ICIC, COMP), and the like.

Current 3GPP standardization efforts relate to a $5^{th}$ generation (5G) standard, referred to as New Radio (NR). NR continues and expands LTE's support for higher bandwidth and data rates by defining operations above 6 GHz, and with even broader bandwidth component carriers. Simultaneously, NR provides support for low-cost, narrowband, high-reliability, low-power, high-coverage devices, sometimes referred to as Machine-to-Machine (M2M) communications, or Narrowband Internet of Things (NB-IoT).

Regardless of its bandwidth, a radio network device desiring to connect to a wireless communication network must acquire network synchronization ("sync"). Network sync allows the radio network device to adjust its internal frequency relative the network, and discover the proper timing of signals received from the network. In NR, network sync will be performed using several signals.

The Primary Synchronization Signal (PSS) allows for network detection with a high frequency error, up to tens of parts per million (ppm). Additionally, PSS provides a network timing reference. 3GPP has selected mathematical constructs known as Zadoff-Chu sequences as PSS signals. One interesting property of ZC sequences is that by careful selection of two such sequences, the same correlation sequence may be used for detection, adding negligible complexity.

The Secondary Synchronization Signal (SSS) allows for more accurate frequency adjustments and channel estimation, while at the same time providing some fundamental network information, such as physical layer cell identity.

The Tertiary Synchronization Signal (TSS) provides timing information within a cell, e.g., between beams transmitted in a cell.

The Physical Broadcast Channel (PBCH) provides a subset of the minimum system information for random access.

These synchronization signals are periodically broadcast together in a System Synchronization Block (SSB). FIG. 1 depicts one possible structure of the SSB for NR. For a given transmission beam, the SSB is transmitted periodically, such as every 20 ms. FIG. 2 depicts the SSB transmission repetition.

The Physical Downlink Shared Channel ($PDSCH_{SIB}$) provides the remaining required parts of the minimum system information necessary for a radio network device to communicate with the network; however, the $PDSCH_{SIB}$ is not part of the SSB. The $PDSCH_{SIB}$ may be transmitted in resources indicated by PBCH.

In LTE, the sync signals are located in the six central resource blocks (RB) of a carrier, using a bandwidth of 1.08 MHz. Accordingly, any radio network device with a receiver bandwidth wider than that could perform network sync. In contrast, in NR, the SSB may span 4.32 MHz for carrier frequencies below 6 GHZ, and may be substantially higher for carrier frequencies above 6 GHz. Furthermore, the PBCH may have a bandwidth up to 5 MHz. Thus, the SSB may be wider in bandwidth than the capabilities of many radio network devices that need to access it—particularly M2M and NB-IoT devices.

This problem has been recognized by 3GPP, but no solution exists. For example, in R1-1704172 which is the 'Final Report of 3GPP TSG RAN WG1 #88 v1.0.0', it was simply stated, on page 61, that, "If min UE bandwidth<NR SS block bandwidth, in NR SS block design, study how to address this issue." Accordingly, there is currently no defined way to perform network sync signal in NR with a narrowband radio network device.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a radio network device, having a narrowband receiver and operative in a wireless communication network, exploits the periodicity of transmission of network sync signals by iteratively receiving a plurality of frequency-offset sub-band signals spanning the sync signal repetition period, and then assembling the sub-band signals to generate a combined signal, from which the sync signal is detected. The sync signal is then utilized to attempt network detection and synchronization. In some embodiments, frequency/time compensation may be applied to the received and stored sub-band signals, prior to their combination, to compensate for uncertainty in the frequency drift (and time drift due to frequency error) of the sync signal location.

One embodiment relates to a method, performed by a radio network device having a narrowband receiver, of receiving and processing a periodic, wideband network sync signal. A candidate sync signal bandwidth and repetition pattern are identified. Iteratively, for each of a plurality of sub-bands of the sync signal bandwidth, a signal is received over the duration of a sync signal repetition period and stored. The plurality of sub-band signals are combined to obtain a combined signal over the full sync signal bandwidth. The combined signal is processed to detect a sync signal and attempt synchronization with a wireless communication network.

Another embodiment relates to a radio network device. The device includes one or more antennas and a transceiver including narrowband receiver circuitry. The device also includes processing circuitry operatively connected to the transceiver. The processing circuitry is operative to: identify a candidate sync signal bandwidth and repetition pattern; iteratively, for each of a plurality of sub-bands of the sync signal bandwidth, receive and store a signal over the duration of a sync signal repetition period; combine the plurality of sub-band signals to obtain combined signal over the full sync signal bandwidth; and process the combined signal to detect a sync signal and attempt synchronization with a wireless communication network.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 3:
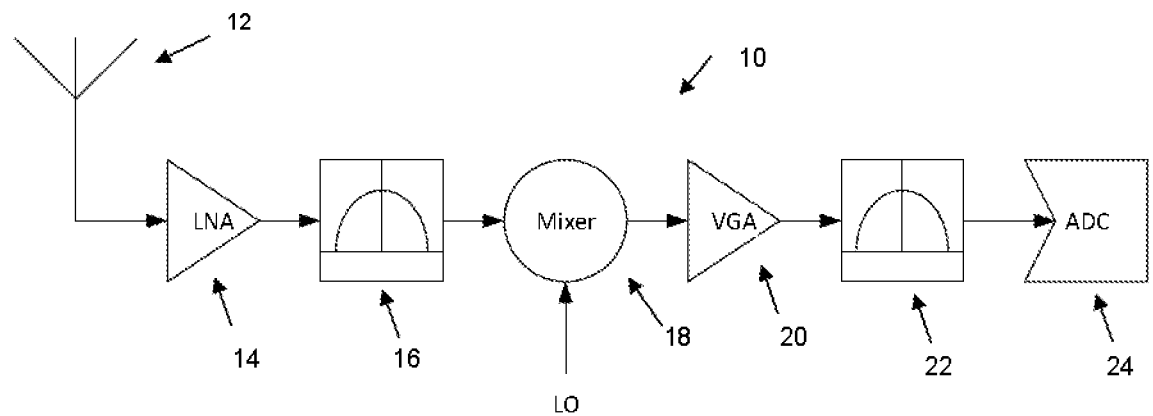
FIG. 3 is a block diagram of a narrowband receiver.

FIG. 3 depicts a block diagram of a typical narrowband radio network device receiver chain 10. The receiver chain 10 includes one or more antennas 12, a Low Noise Amplifier (LNA) 14, filters 16, a downconverting mixer 18, a Variable Gain Amplifier (VGA) 20, additional filters 22, and an Analog-to-Digital Converter (ADC) 24. In addition to the received signal, a locally-created reference frequency signal is injected into the mixer from a local oscillator (LO). The LO signal is created from a crystal that generates a certain fundamental frequency.

Typically, at power-on, the open-loop LO frequency inaccuracy in a radio network device is on the order of 10 ppm for crystals below 50 MHz. For higher frequency crystals (~200 MHz), which may be required for higher carrier frequencies, the inaccuracy may be up to 50 ppm. Greater accuracy may be obtained by the use of higher quality crystals; however this substantially increases receiver cost. Although the PSS is designed to be detected with a frequency error, it is necessary for the radio network device to test different frequency error hypotheses by performing a grid search over possible frequency errors. Once a likely PSS is detected, the radio network device may continue to detect SSS and PBCH for further processing.

It is possible to represent time signals in the frequency domain by help of Fourier transforms or Fourier series. From these, the relation between an offset in frequency and its corresponding time domain representation may be expressed as:

$$f(t)e^{j2\pi f_0 t} \Leftrightarrow F(2\pi f - 2\pi f_0)$$

Hence, a time domain signal f(t) may be frequency translated by multiplying the signal with a complex value $e^{j2\pi f_0 t}$, where $f_0$ represents the amount of frequency translation to be done and t represents the sampling instants of the time signals. This relationship is also used to frequency-translate received and stored sub-band signal for assembly into a combined broadband signal, as further described herein.

According to embodiments of the present invention, a radio network device having a narrowband receiver effectively receives a wideband sync signal by receiving and storing successive, narrowband, frequency-offset "slices," or sub-band signals, each of which span a temporal duration equal to the sync signal repetition period. The minimum number k of such slices, or sub-band signals, required to receive the whole wideband sync signal is given by:

$$k = \left\lceil \frac{f_{SSB}}{f_{RX}} \right\rceil$$

where $f_{SSB}$ is the sync signal bandwidth, $f_{RX}$ is the radio network device bandwidth, and $\lceil \cdot \rceil$ represents the ceiling rounding operation.

Figure 4:
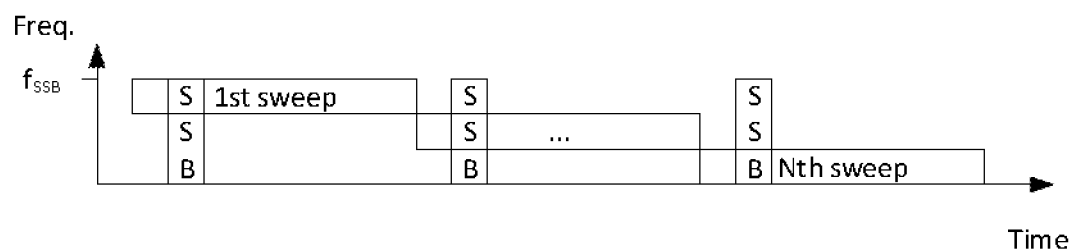
FIG. 4 is a time/frequency diagram depicting successive sweeps of offset frequencies, each over a SSB repetition period, so as to receive a plurality of sub-band signals.

FIG. 4 depicts this process graphically. Initially, a first sub-band signal is received at a first frequency and over a predetermined time duration equal to the SSB repetition period. This sub-band signal is stored. The radio network device receiver then shifts its reception frequency and receives a second sub-band signal over a the same duration. The timing of the reception iterations is determined by the defined repetition rate of the SSB retransmission. After k such sweeps, the received sub-band signals are appropriately frequency-offset and combined, and the desired sync signal (having its full bandwidth) is detected from the combined signal. Network access using the sync signal is then attempted. In some embodiments, each sub-band signal will comprise an integer number of OFDM sub-carriers.

Figure 1:
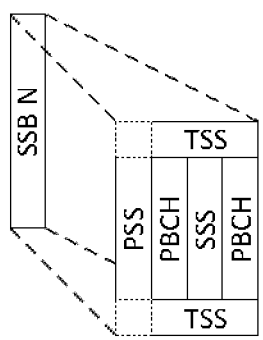
FIG. 1 is a representative time/frequency diagram of the components of a System Synchronization Block (SSB).
Figure 2:
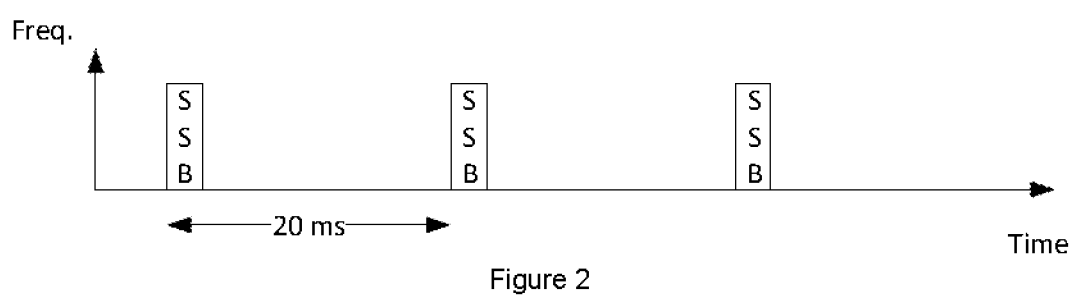
FIG. 2 is a time/frequency diagram depicting the repetition of SSB transmission.
Figure 5:
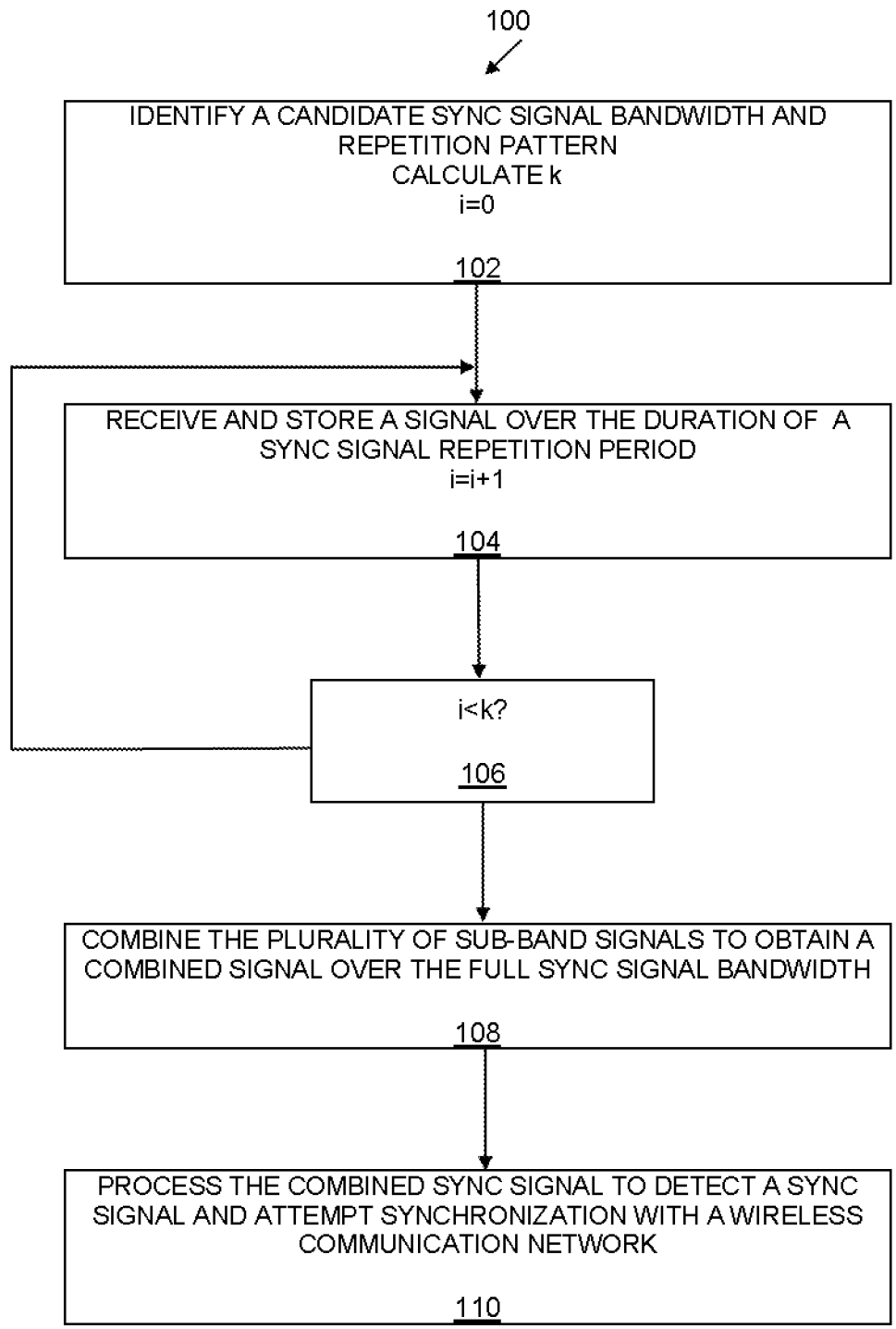
FIG. 5 is a flow diagram of a method of receiving and processing a periodic, wideband network sync signal by a radio network device having a narrowband receiver.

FIG. 5 depicts the steps of a method 100, performed by a radio network device having a narrowband receiver, of receiving and processing a periodic, wideband network sync signal. The sync signal may be a PSS, SSS, TSS, or other periodic, wideband network sync signal. In one embodiment, the sync "signal" may comprise a signal block, such as the SSB depicted in FIGS. 1 and 2. The radio network device identifies a candidate sync signal bandwidth and repetition pattern (block 102). This identification may, for example, derive from an a priori known raster, which may be searched in a determined (or arbitrary) order; or it may have been received from inter-frequency or inter-RAT handover signaling. As indicated in block 102, the radio network device may also calculate the number k of receiving iterations required, based on the sync signal bandwidth $f_{SSB}$ and the receiver bandwidth fax. The radio network device may initialize a counter value i.

On each of successive iterations of block 104, the radio network device receives and stores a sub-band of the sync signal bandwidth, over the duration of a sync signal repetition period. The sub-band signals may be configured such that their 3 dB bandwidths (for the upper and lower frequency edges) coincide. Other configurations may also be used, e.g., if a sync signal bandwidth may be covered with fewer sub-bands by using a wider distance, this may be a preferred solution in some cases. In one embodiment, the sub-band signals are selected such that the combined power spectrum is optimally flat, but also other possible combinations are possible. As each sub-band signal is received and stored, the radio network device may increment the counter i. If the number i of iterations performed is less than the required number k (block 106), the radio network device repeats step 104 and reads another sub-band signal. Note that the sub-band may be received in a specific order (e.g., sequentially) or in a random order, or in an order that is particularly preferable for the radio network device.

When i=k (block 106), the radio network device combines the plurality of received and stored sub-band signals, to obtain a combined signal over the full sync signal bandwidth (block 108). In one embodiment, combining the sub-band signals includes: upsampling each sub-band signal by zero padding and filtering such that each sub-band signal may resolve the full sync signal bandwidth; individually frequency translating each upsampled sub-band signal to a different position within the full sync signal bandwidth; and adding the translated, upsampled sub-band signals to generate a combined signal over the full sync signal bandwidth.

Figure 6:
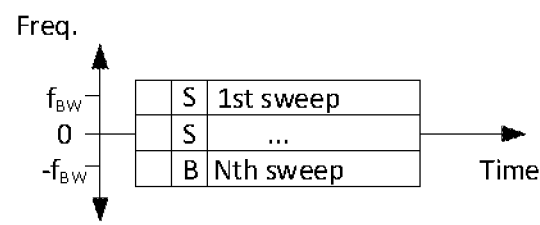
FIG. 6 is a baseband frequency diagram of a combined signal constructed from sub-band signals.

In order to maintain the baseband representation at DC, it may be preferable that the lower half of the sync signal portions are multiplied with a negative frequency and the upper half are multiplied with a positive frequency, as shown in FIG. 6. Having translated each sub-band signal with its separate frequency translation, a bandwidth equal or larger than the full sync signal bandwidth is obtained. The frequency translations may be performed using the Fourier relationships described above:

The combined signal is then processed to detect a sync signal. For example, the combined signal may be correlated against a known a priori PSS (or other) sequence, such as a Z-C sequence. Once the sync signal is detected, the radio network device attempts synchronization with the wireless communication network (block 110). In one embodiment, for the case where a Phase Locked Loop (PLL) of the device is uncalibrated, it may be necessary to perform multiple network sync attempts, each for a given hypothesized frequency error $f_e$, until sync may be detected. This is performed by another frequency translation for the combined signal, where the translation corresponds to a hypothesized frequency error. In some embodiments, the combination may also take time drift into account. Since the crystal oscillator driving the LO frequency may have some 10 ppm frequency error, this may also imply a time drift.

Accordingly, the combined signal may include numerous combinations. For example, in the simplified case of k=2, where $T_S$ is the SSB sync period and $X_1$ and $X_2$ are the two different sub-band signals, the combined signal, with no time drift, is:

$$Y(t)=X_1(t)+X_2(t+T_S)$$

The combination with the hypothesis that the time drift is $\Delta$ symbols is:

$$Y(t)=X_1(t)+X_2(t+T_S+\Delta)$$

where $\Delta$ may be a positive or negative number. For the case where $\Delta$ is a non-integer, the sequence may be interpolated from adjacent samples.

In general, a radio network device has no knowledge of the timing of SSB, other than its bandwidth (e.g., 4.32 MHz) and periodicity (e.g., 20 msec). If the radio network device did have at least some idea of where in time the SSB repetitions occur, it would time each of the k sweeps to begin/switch at the midpoint between SSB repetitions (or, indeed, reduce the duration of the sweep dramatically from the full 20 msec to just before and after the SSB). However, in general, the SSB could occur anywhere within the repetition period $P_{SSB}$. In one embodiment, to account for the possibility that a full duration SSB is not included in a sweep, the radio network device may decide to record each sub-band signal for longer than $P_{SSB}$. This will ensure that the SSB is guaranteed to be contained in a sweep. However, the radio network device will then have to wait $P_{SSB}-t_{SSB}$ between each sweep.

In the event that the initial (PSS) network detection is successful, the radio network device may continue by detecting, e.g., a secondary sync signal (SSS) or reading broadcast data (PBCH). Alternatively, in the event of an unsuccessful detection, the radio network device may repeat block 110 of the method 100 with another frequency error hypothesis such that eventually a range of frequency errors, corresponding to the open loop inaccuracy of the crystal, have been explored and attempted. In some rare cases, synchronization may not be possible, and the radio network device may repeat the entire method 100, using different assumptions for the SSB location.

Figure 7:
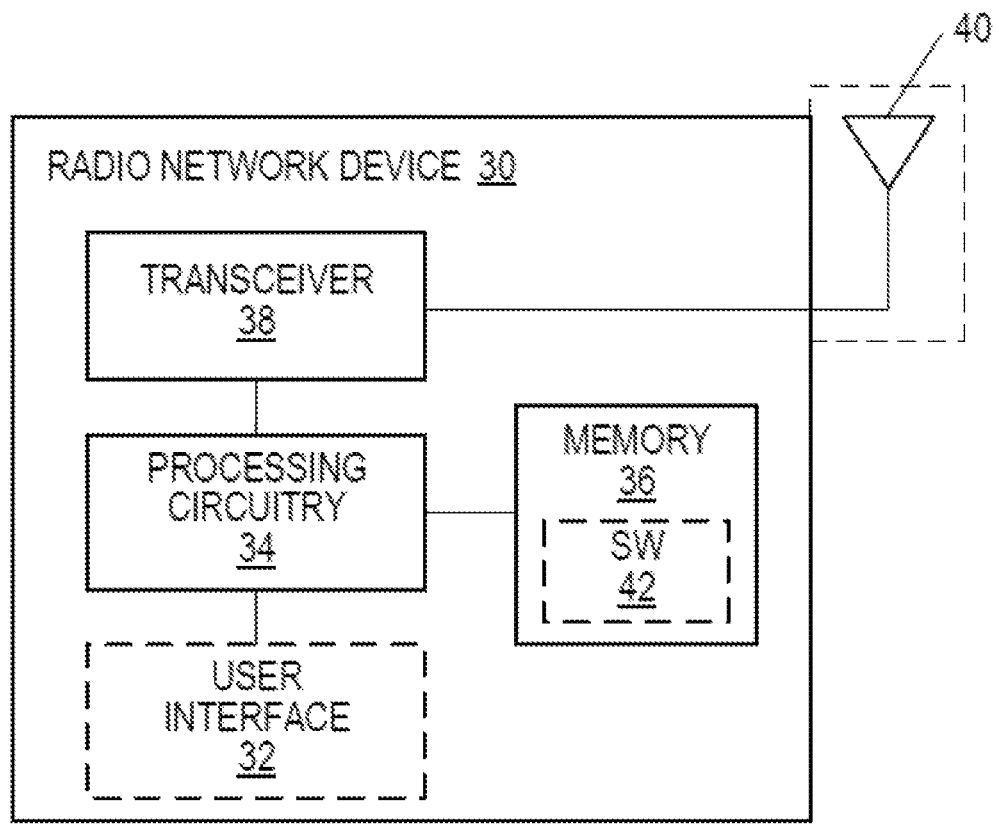
FIG. 7 is a block diagram of a radio network device.

FIG. 7 depicts a radio network device 30 having a narrowband receiver 10. A radio network device 30 is any type device capable of communicating with a network node and/or access point using radio signals. A radio network device 30 may therefore refer to a machine-to-machine (M2M) device, a machine-type communications (MTC) device, a Narrowband Internet of Things (NB IoT) device, etc. The radio network device 30 may also be a User Equipment (UE), such as a cellular telephone or "smartphone." A radio network device 30 may also be referred to as a radio device, a radio communication device, a radio network device, a wireless terminal, or simply a terminal—unless the context indicates otherwise, the use of any of these terms is intended to include device-to-device UEs or devices, machine-type devices, or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be configured to transmit and/or receive data without direct human interaction.

Figure 8:
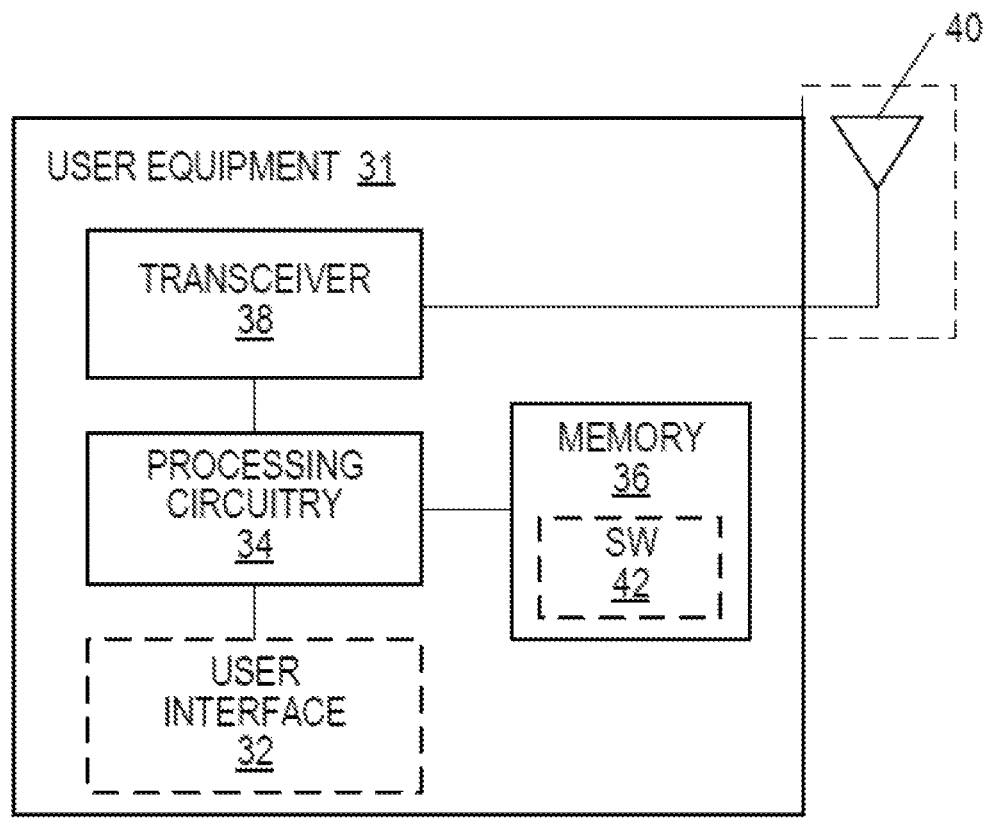
FIG. 8 is a block diagram of a UE.

In some embodiments, the radio network device 30 includes a user interface 32 (display, touchscreen, keyboard or keypad, microphone, speaker, and the like); in other embodiments, such as in many M2M, MTC, or NB IoT scenarios, the radio network device 30 may include only a minimal, or no, user interface 32 (as indicated by the dashed lines of block 32 in FIG. 8). The radio network device 30 also includes processing circuitry 34; memory 36; and radio circuits, such a transceiver 38, one or more antennas 40, and the like, to effect wireless communication across an air interface to one or more radio network nodes and/or access points. As indicated by the dashed lines, the antenna(s) 40 may protrude externally from the radio network device 30, or the antenna(s) 40 may be internal. The transceiver 38 may include the receiver 10 depicted in FIG. 3.

FIG. 8 depicts an embodiment in which the radio network device 30 is a UE 31. In general, the UE 31 includes the same circuits and components described above. In particular, the UE 31 may include a sophisticated user interface 32, and may additionally include features such as a camera, accelerometer, satellite navigation signal receiver circuitry, vibrating motor, and the like (not depicted in FIG. 8). Although most UE 31 are anticipated to have wideband receivers, a particular UE 31 may include a receiver with a limited bandwidth, or which for various reasons (e.g., very strict control of power consumption in some modes) is operated only over a narrow bandwidth.

The processing circuitry 34 may comprise any sequential state machine operative to execute machine instructions stored as machine-readable computer programs in memory 36, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

The memory 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The radio circuits may comprise one or more transceivers 38 used to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, NR, or the like. The transceiver 38 implements transmitter and receiver functionality appropriate to the RAN links (e.g., frequency allocations and the like). The transmitter and receiver functions may share circuit components and/or software, or alternatively may be implemented separately.

According to embodiments of the present invention, the memory 36 is operative to store, and the processing circuitry 34 operative to execute, software 42 which when executed is operative to cause the radio network device 30 to iteratively receive portions of a periodic, wideband sync signal, and assemble the portions to generate a combined sync signal with which to attempt network discovery. In particular, the software 42, when executed on the processing circuitry 34, is operative to perform the method 100 described and claimed herein. This allows the radio network device 30 having a narrowband receiver 10 to reliably receive and process wideband sync signals.

Figure 9:
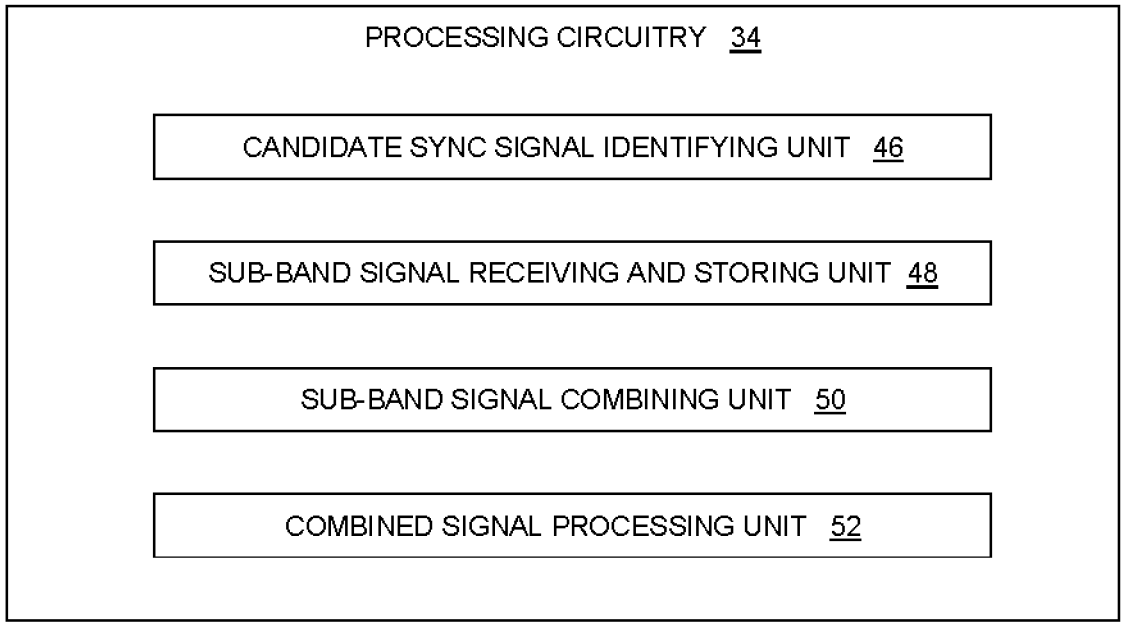
FIG. 9 is a diagram of physical units in processing circuitry in the radio network device of FIG. 7 or the UE of FIG. 8.

FIG. 9 illustrates example processing circuitry 34, such as that in the radio network device 30 of FIG. 7 or the UE 31 of FIG. 8. The processing circuitry 34 comprises a plurality of physical units. In particular, the processing circuitry 34 comprises a candidate sync signal identifying unit 46, a sub-band signal receiving and storing unit 48, a sub-band signal combining unit 50, and a combined signal processing unit 52.

The candidate sync signal identifying unit 46 is configured to identify a candidate sync signal bandwidth and repetition pattern. The sub-band signal receiving and storing unit 48 is configured to iteratively, for each of a plurality of sub-bands of the sync signal bandwidth, receive and store a signal over the duration of a sync signal repetition period. The sub-band signal combining unit 50 is configured to combine the plurality of sub-band signals to obtain combined signal over the full sync signal bandwidth. The combined signal processing unit 52 is configured to process the combined signal to detect a sync signal and attempt synchronization with a wireless communication network.

Figure 10:
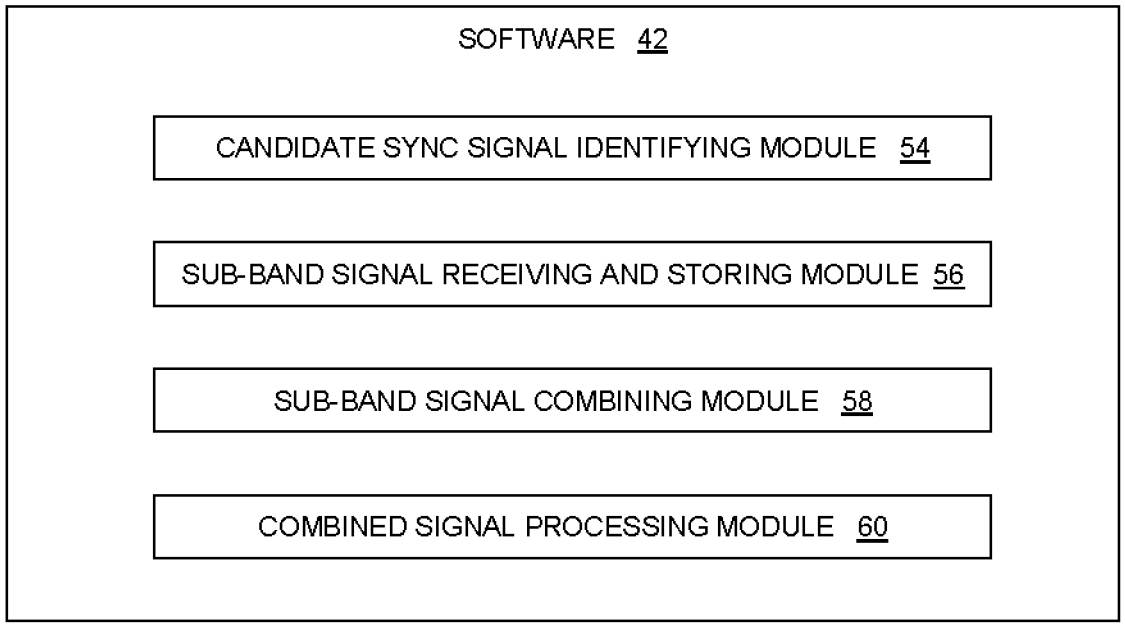
FIG. 10 is a diagram of software modules in memory in the radio network device of FIG. 7 or the UE of FIG. 8.

FIG. 10 illustrates example software 42, such as that in memory 36 in the radio network device 30 of FIG. 8 or the UE 31 of FIG. 9. The software 42 comprises a plurality of software modules. In particular, the software 42 comprises a candidate sync signal identifying module 54, a sub-band signal receiving and storing module 56, a sub-band signal combining module 58, and a combined signal processing module 60.

The candidate sync signal identifying module 54 is configured to identify a candidate sync signal bandwidth and repetition pattern. The sub-band signal receiving and storing module 56 is configured to iteratively, for each of a plurality of sub-bands of the sync signal bandwidth, receive and store a signal over the duration of a sync signal repetition period. The sub-band signal combining module 58 is configured to combine the plurality of sub-band signals to obtain combined signal over the full sync signal bandwidth. The combined signal processing module 60 is configured to process the combined signal to detect a sync signal and attempt synchronization with a wireless communication network.

Embodiments of the present invention present numerous advantages over the prior art. Currently no procedure is defined for a narrowband radio network device to receive and process a wideband sync signal, such as those proposed for NR. One of the major features of NR is support for massive numbers of simple, low-cost, narrowband M2M and NB-IoT radio network devices. Embodiments of the present invention provide a methodology for these narrowband radio network devices to access wireless communication networks.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method, performed by a radio network device having a narrowband receiver, of receiving and processing a periodic, wideband network synchronization (sync) signal, the method comprising:
identifying a candidate sync signal bandwidth and repetition pattern;
iteratively, for each of a plurality of sub-bands of the candidate sync signal bandwidth, receiving and storing a signal over a duration of a candidate sync signal repetition period;
combining the plurality of stored sub-band signals to obtain a combined signal over the full candidate sync signal bandwidth by
upsampling each sub-band signal by zero padding and filtering such that each sub-band signal fits the full candidate sync signal bandwidth,
individually frequency translating each upsampled sub-band signal to a different position within the full candidate sync signal bandwidth, and
adding the translated, upsampled sub-band signals to generate the combined signal over the full candidate sync signal bandwidth; and
processing the combined signal to detect the wideband network sync signal and attempt synchronization with a wireless communication network.

2. The method of claim 1 wherein identifying a candidate sync signal bandwidth and repetition pattern comprises obtaining a candidate sync signal position from a sync raster known a priori.

3. The method of claim 1 wherein identifying a candidate sync signal bandwidth and repetition pattern comprises obtaining a candidate sync signal position via handover signaling.

4. The method of claim 1 wherein the number k of sub-bands of the sync signal bandwidth is given by $$k = \left\lceil \frac{f_{SSB}}{f_{RX}} \right\rceil$$

where $f_{SSB}$ is the sync signal bandwidth, $f_{RX}$ is the radio network device bandwidth, and $\lceil \cdot \rceil$ represents a ceiling rounding operation.

5. The method of claim 1 wherein receiving and storing each sub-band signal comprises receiving each sub-band signal such that 3 dB bandwidth points for the upper and lower frequency edges coincide.

6. The method of claim 1 wherein receiving and storing each sub-band signal comprises receiving each sub-band signal such that a combined power spectrum over all received sub-band signals is the most flat.

7. The method of claim 1 wherein receiving and storing each sub-band signal comprises receiving and storing each sub-band signal in sequential frequency order.

8. The method of claim 1 wherein upsampling each sub-band signal comprises k times upsampling where k sub-band signals are received and stored.

9. The method of claim 1 wherein frequency translating each upsampled sub-band signal comprises frequency translating half of the plurality of stored sub-band signals by a negative frequency so the full sync signal bandwidth is centered at baseband.

10. The method of claim 1 wherein processing the combined signal to detect a sync signal and attempt synchronization with a wireless communication network comprises frequency translating the combined signal by a hypothesized frequency error prior to attempting synchronization with the network.

11. A radio network device, comprising:
one or more antennas;
a transceiver including narrowband receiver circuitry; and
processing circuitry operatively connected to the transceiver and operative to identify a candidate sync signal bandwidth and repetition pattern;
iteratively, for each of a plurality of sub-bands of the candidate sync signal bandwidth, receive and store a signal over the a duration of a candidate sync signal repetition period;
combine the plurality of stored sub-band signals to obtain combined signal over the full candidate sync signal bandwidth by
upsampling each sub-band signal by zero padding and filtering such that each sub-band signal fits the full candidate sync signal bandwidth,
individually frequency translating each upsampled sub-band signal to a different position within the full candidate sync signal bandwidth, and
adding the translated, upsampled sub-band signals to generate the combined signal over the full candidate sync signal bandwidth; and process the combined signal to detect the wideband network sync signal and attempt synchronization with a wireless communication network.

12. The device of claim 11 wherein the processing circuitry is operative to identify a candidate sync signal bandwidth and repetition pattern by obtaining a candidate sync signal position from a sync raster known a priori.

13. The device of claim 11 wherein the processing circuitry is operative to identify a candidate sync signal bandwidth and repetition pattern by obtaining a candidate sync signal position via handover signaling.

14. The device of claim 11 wherein the number k of sub-bands of the sync signal bandwidth is given by $$k = \left\lceil \frac{f_{SSB}}{f_{RX}} \right\rceil$$

where $f_{SSB}$ is the sync signal bandwidth, $f_{RX}$ is the radio network device bandwidth, and $\lceil \cdot \rceil$ represents a ceiling rounding operation.

15. The device of claim 11 wherein the processing circuitry is operative to receive and store each sub-band signal by receiving each sub-band signal such that 3 dB bandwidth points for the upper and lower frequency edges coincide.

16. The device of claim 11 wherein the processing circuitry is operative to receive and store each sub-band signal by receiving each sub-band signal such that a combined power spectrum over all received sub-band signals is optimally the most flat.

17. The device of claim 11 wherein the processing circuitry is operative to receive and store each sub-band signal by receiving and storing each sub-band signal in sequential frequency order.

18. The device of claim 11 wherein upsampling each sub-band signal comprises k times upsampling where k sub-band signals are received and stored.

19. The device of claim 11 wherein frequency translating each upsampled sub-band signal comprises frequency translating half of the portions plurality of stored sub-band signals to by a negative frequency so the full sync signal bandwidth is centered at baseband.

20. The device of claim 11 wherein the processing circuitry is operative to process the combined signal to detect a sync signal and attempt synchronization with a wireless communication network by frequency translating the combined signal by a hypothesized frequency error prior to attempting synchronization with the network.

* * * * *